United States Patent [19]
Kaneko et al.

[11] 3,988,161
[45] Oct. 26, 1976

[54] FOAMED SODIUM SILICATE CERAMIC AND METHOD OF MANUFACTURING THE SAME
[75] Inventors: Yasuhisa Kaneko; Katsumi Kondo; Fumiyoshi Noda; Mikio Murachi; Yuji Watanabe, all of Toyota, Japan
[73] Assignee: Toyota Jidosha Kogyo Kabushiki Kaisha, Toyota, Japan
[22] Filed: May 28, 1974
[21] Appl. No.: 473,664

[30] Foreign Application Priority Data
May 28, 1973 Japan.............................. 48-059473

[52] U.S. Cl. ................................................. 106/75
[51] Int. Cl.$^2$........................................ C04B 21/00
[58] Field of Search............................. 106/40 R, 75

[56] References Cited
UNITED STATES PATENTS

| | | | |
|---|---|---|---|
| 2,978,340 | 4/1961 | Veatch et al. ........................ | 106/75 |
| 3,663,249 | 5/1972 | Rao..................................... | 106/75 |
| 3,743,601 | 7/1973 | Rao..................................... | 106/75 |

*Primary Examiner*—J. Poer
*Attorney, Agent, or Firm*—Brisebois & Kruger

[57] ABSTRACT

Foamed sodium silicate ceramic obtained by mixing sodium silicate 30–36% by weight of aluminum hydroxide or 30–36% by weight of aluminum hydroxide and 5–20% by weight of ceramic fibers; and method of manufacturing the same.

2 Claims, 8 Drawing Figures

Fig. 7
(a)
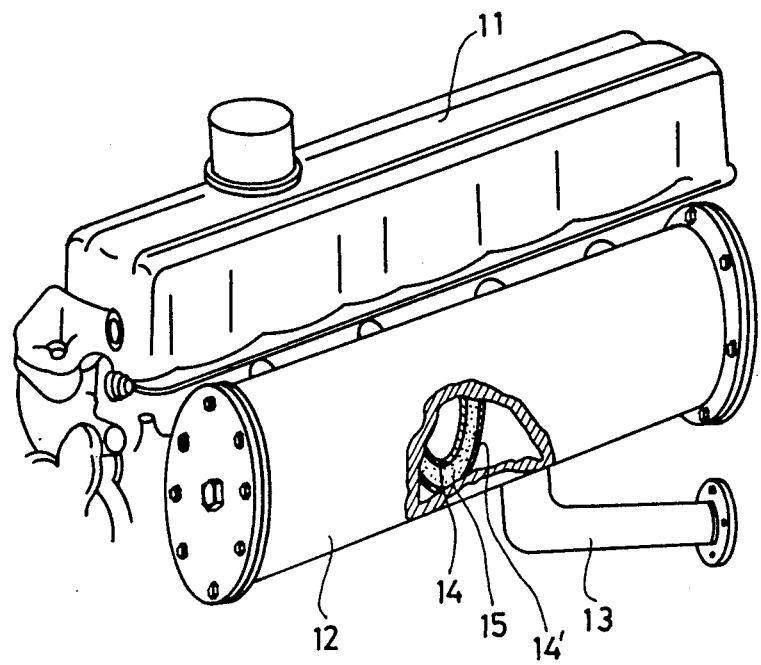
(b)
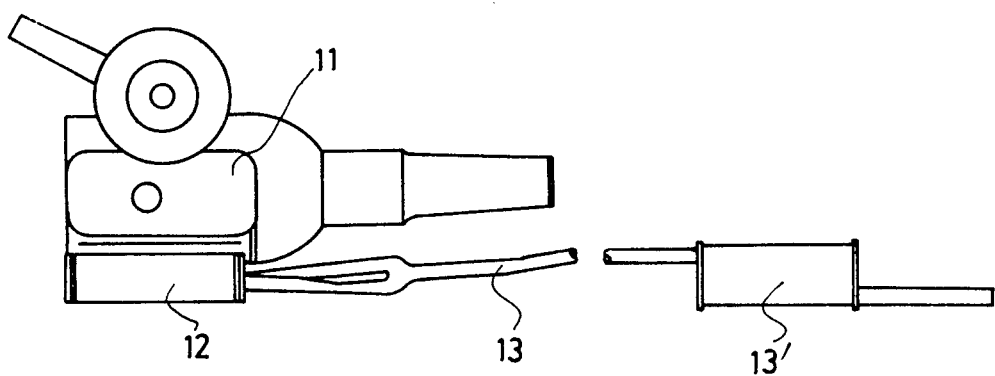

FOAMED SODIUM SILICATE CERAMIC AND METHOD OF MANUFACTURING THE SAME

BACKGROUND OF THE INVENTION

The conventional auto exhaust gas purifiers include a manifold reactor, a catalyst converter and so on. For the purpose of preserving the internal heat of these devices, while reducing their exhaust gas emission and preventing the heat in these devices from being transferred to the other auto parts with adverse effect, a heat insulating material which is durable at high temperatures is required. The heat resistance of the foamed sodium silicate ceramics heretofore used as heat insulating materials can be improved by adding aluminum hydroxide, but 500°–600° C is said to be the upper limit to which the ceramics thus improved can resist heat.

At the same time, ceramic fibers are often used for insulation of manifold reactors, but they cause various problems in that the fibers tend to fly out into the exhaust gas through gaps in welded joints which have been broken under repeated application of thermal stresses due to temperature variations, or to clog the bypass valve of the catalyst converter or the valve of the exhaust gas recirculator (EGR).

SUMMARY OF THE INVENTION

The object of the present invention is to provide a foamed sodium silicate ceramic having excellent heat insulating properties, and good resistance to thermal shock, together with a method of manufacturing said ceramic.

BRIEF DESCRIPTION OF THE DRAWINGS

FIG. 7a is a partially cutaway oblique view of an engine equipped with a manifold reactor according to the present invention; and FIG. 7b is a side view of the engine shown in FIG. 7a.

Figure 1:
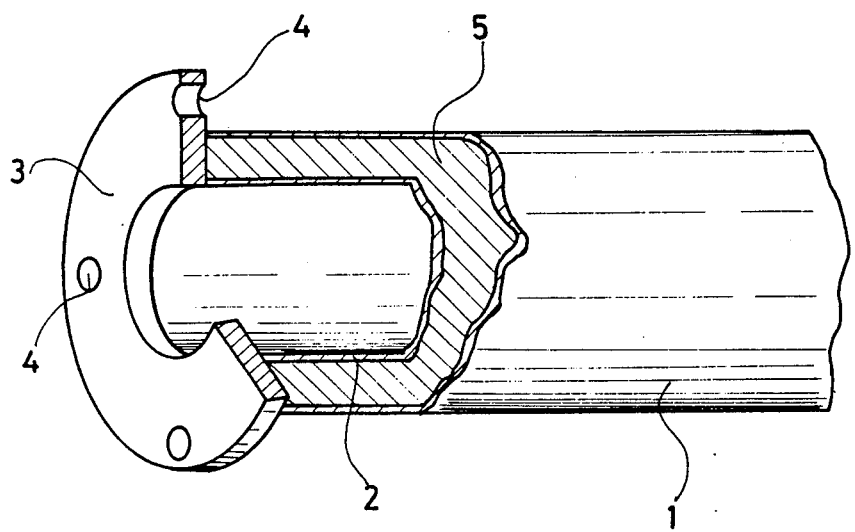
FIG. 1 is an oblique view of a double exhaust pipe, shown partially in section.

In these figures, reference numeral 1 indicates an external cylinder, 2 an internal cylinder, 3 a flange, 4 a bolt hole, 5 the heat insulating layer of an exhaust pipe, 6 a vessel, 7 the bottom of the vessel, 8 the lid of the vessel, 9, 9' bolts, 10 a foamed ceramic material, 11 an engine, 12 a manifold reactor, 13 an exhaust pipe, 14 an internal heat-insulating cylinder, 14' an external heat-insulating cylinder, and 15 the heat-insulating layer of a manifold reactor.

DETAILED DESCRIPTION OF THE INVENTION

Foamed sodium silicate ceramic according to the present invention has the following characteristics: It is heat-resistant at over 900° C; it has excellent resistance to thermal shock when ceramic fibers are added thereto as a lightweight aggregate; the material used in the manufacturing process is a foamed ceramic powder which is simple to charge and can be molded into a heat-insulating layer which is complicated in shape; and it can be manufactured at low cost.

The method of manufacturing a foamed sodium silicate ceramic according to the present invention comprises the following simple steps.

For example, sodium silicate JIS-3 is blended with aluminum hydroxide. The mixture is sprayed and dried at 140°–200° C to produce a powder. When ceramic fibers are to be added thereto, the powder obtained by spraying and drying is blended with a ceramic fiber powder. Next the mixture of these powders is charged into a mold for heating and foaming to make a heat-insulating layer.

The reason why the additions of aluminum hydroxide and ceramic fibers are limited as set forth in the present invention will now be explained, with illustrations of test examples:

TEST EXAMPLE 1

Sodium silicate JIS-3 (composition: $SiO_2$—29.5%, $NaO$—9.7%, $FeO$—0.008%, water-insolubles 0.1%, balance $H_2O$) was mixed, according to Table 1, with aluminum hydroxide (composition: $Al_2O_3$—59.7%, $Na_2O$—0.2%, $SiO_2$—0.01%, $Fe_2O_3$—0.01%, balance ignition loss). After spraying and drying at 150° C with a disk type spray-drier, the mixture was ground to a powder less than 1mm in particle size.

A double-walled cylinder of iron as shown in FIG. 1 with inner diameter 40mm, outer diameter 60mm and length 500mm had a flange 3 welded to one end thereof; and with the flanged side down, the above powder was charged into this cylinder from the other side to fill it up to ⅛ of its height. The cylinder was then held at temperatures of 300° C, 400° C, 500° C, 600° C, 700° C, 800° C and 900° C for 30 minutes each. The rates of increase in volume at these temperatures were plotted for each powder, with the results shown in FIG. 2.

Figure 2:
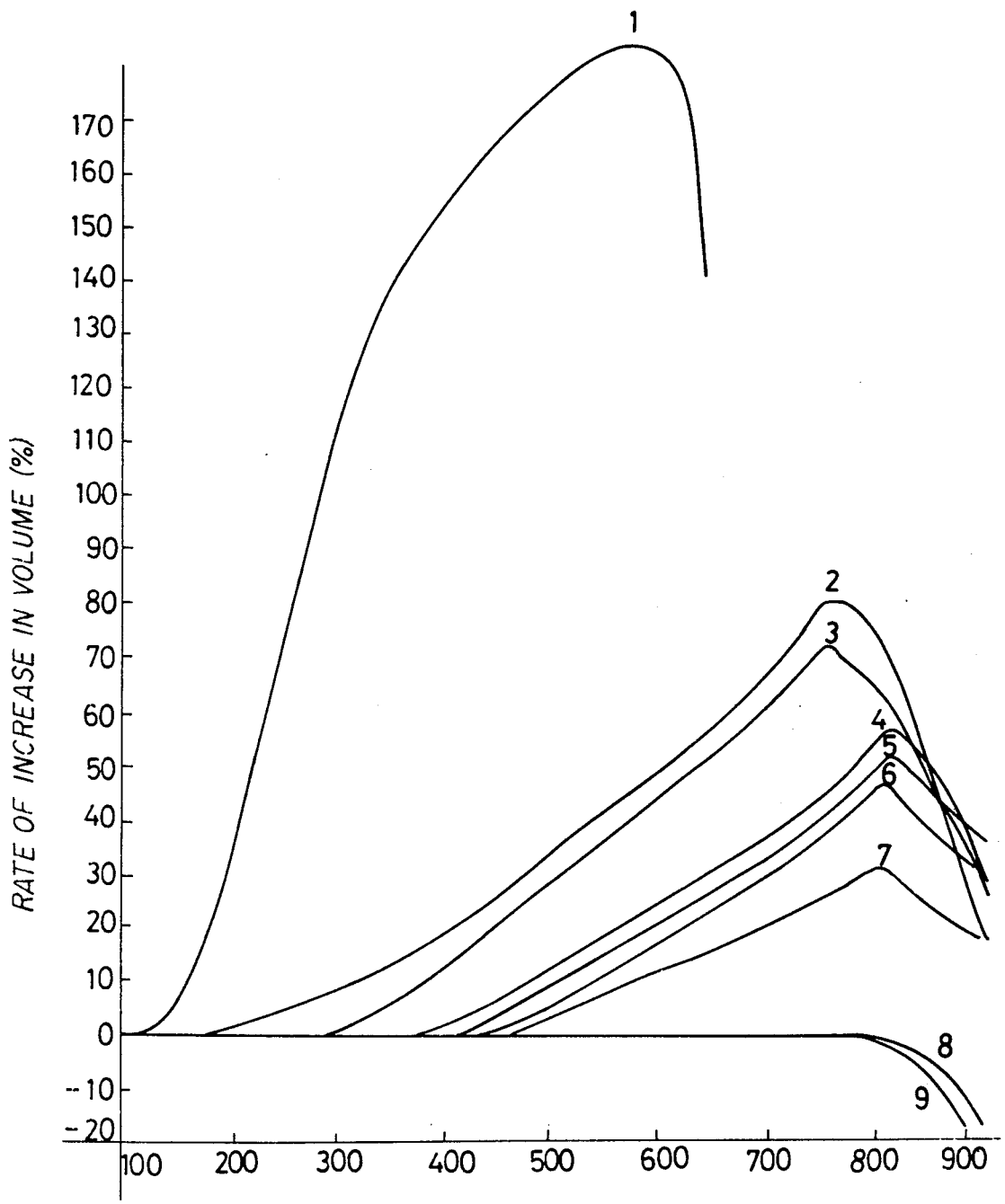
FIG. 2 is a graph showing the rate at which the volume of the material increases at different foaming temperatures with different additions of aluminum hydroxide.

The data in FIG. 2 shows that powders No. 8 and No. 9 which include large quantities of aluminum hydroxide and increase less in volume, that is, foam less, were found unfit for use; thus the appropriate aluminum hydroxide content is up to 36%.

The double-walled cylinder of iron illustrated in FIG. 1 is a heat-insulated exhaust pipe consisting of the outer cylinder 1, the inner cylinder 2, the flange 3, the bolt hole 4 and the heat-insulating layer 5. This pipe can be attached by means of the flange 3 to a real vehicle.

The numbers indicated in Table 1 are used for the references in test examples and specific embodiments.

TABLE 1

| No. | Aluminum hydroxide content (% by weight) |
|-----|------------------------------------------|
| 1   | 0                                        |
| 2   | 17                                       |
| 3   | 23                                       |
| 4   | 29                                       |

TABLE 1-continued

| No. | Aluminum hydroxide content (% by weight) |
|---|---|
| 5 | 31 |
| 6 | 33 |
| 7 | 36 |
| 8 | 38 |
| 9 | 41 |

TEST EXAMPLE 2

Figure 3:
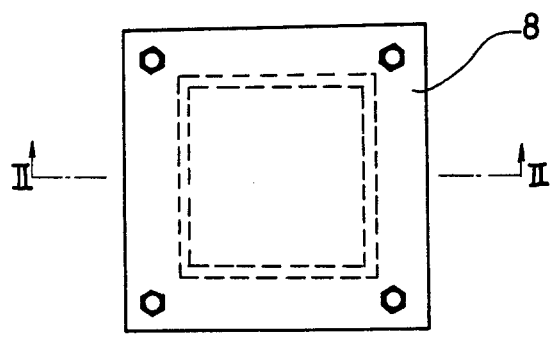
FIG. 3 is a front elevational view of a jig for manufacturing the foamed ceramic.
Figure 4:
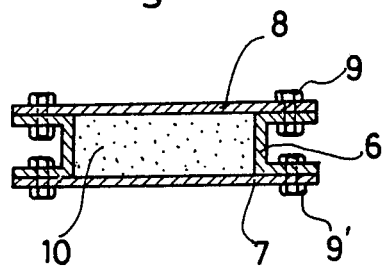
FIG. 4 is a sectional view taken along the line II—II of FIG. 3.

The vessel 6 (internal capacity: 100 × 100 × 10mm) of the jig for manufacturing a foamed ceramic (material: JIS-SUS-304) as illustrated in FIGS. 3 and 4 was placed on the bottom 7 and bolted by 9' thereto. The vessel was then filled until 90% full with the powders in Test Example 1 with various quantities of aluminum hydroxide, and placed under the lid 8 which was bolted down by bolts 9. The vessel, when filled with the powder No. 8 in Test Example 1, was held at 900° C, and in the examples at 600° C, for 30 minutes for foaming. The foamed product was cut into specimens 50 × 50 × 8mm, which were held for 5 hours at every temperature rise of 100° C in the range of 400°–1000° C, and the reduction in volume at each temperature was measured. The results are shown in FIG. 5, which shows that Nos. 5–8 produce reductions in volume of less than 20% at 1000° C and accordingly an aluminum hydroxide content of more than 30% is necessary to improve the heat resistance.

Figure 5:
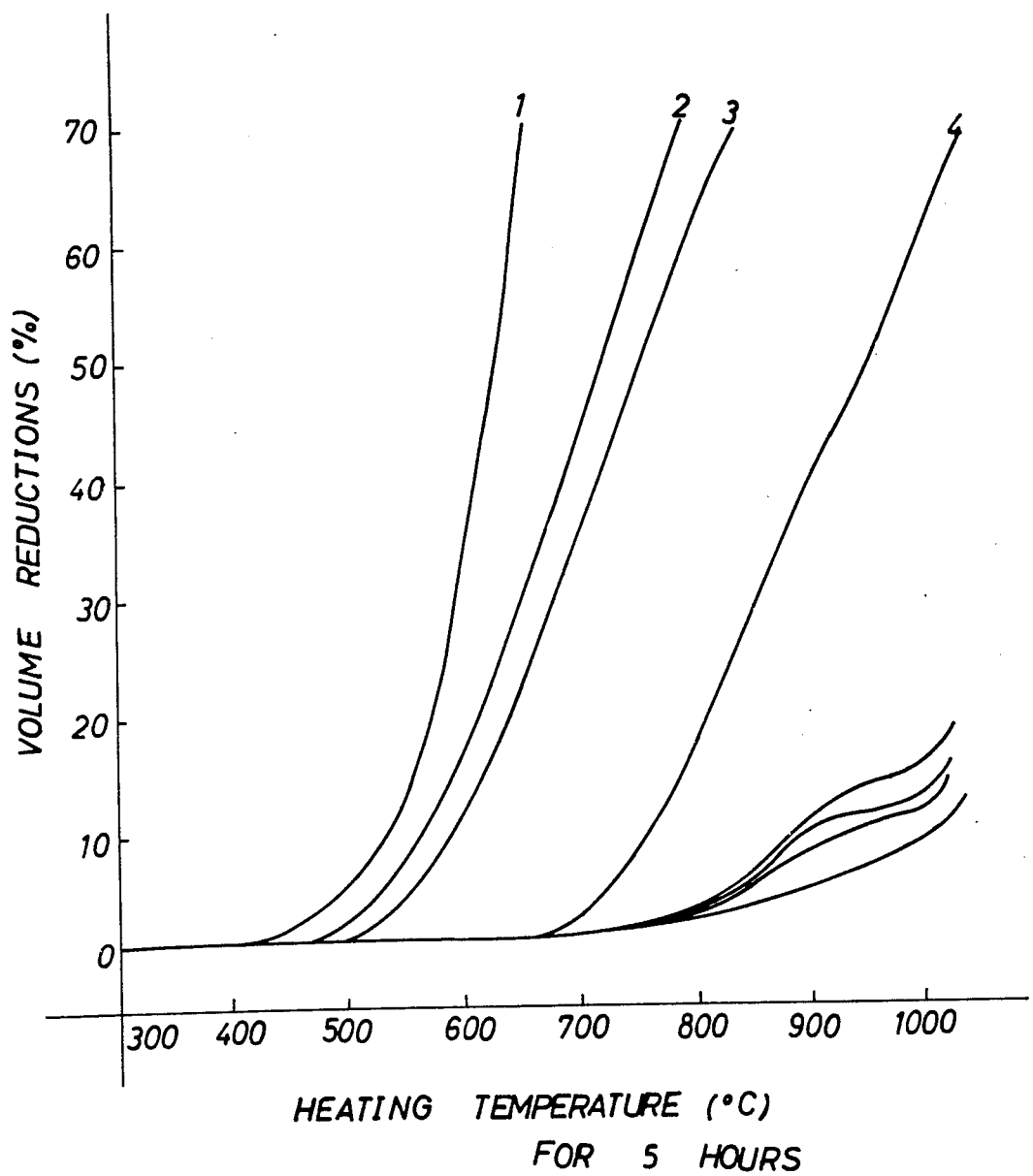
FIG. 5 is a graph showing the reductions in volume at different temperatures of the foamed ceramic with different additions of aluminum hydroxide when the mixture is foamed and then heated.
Figure 6:
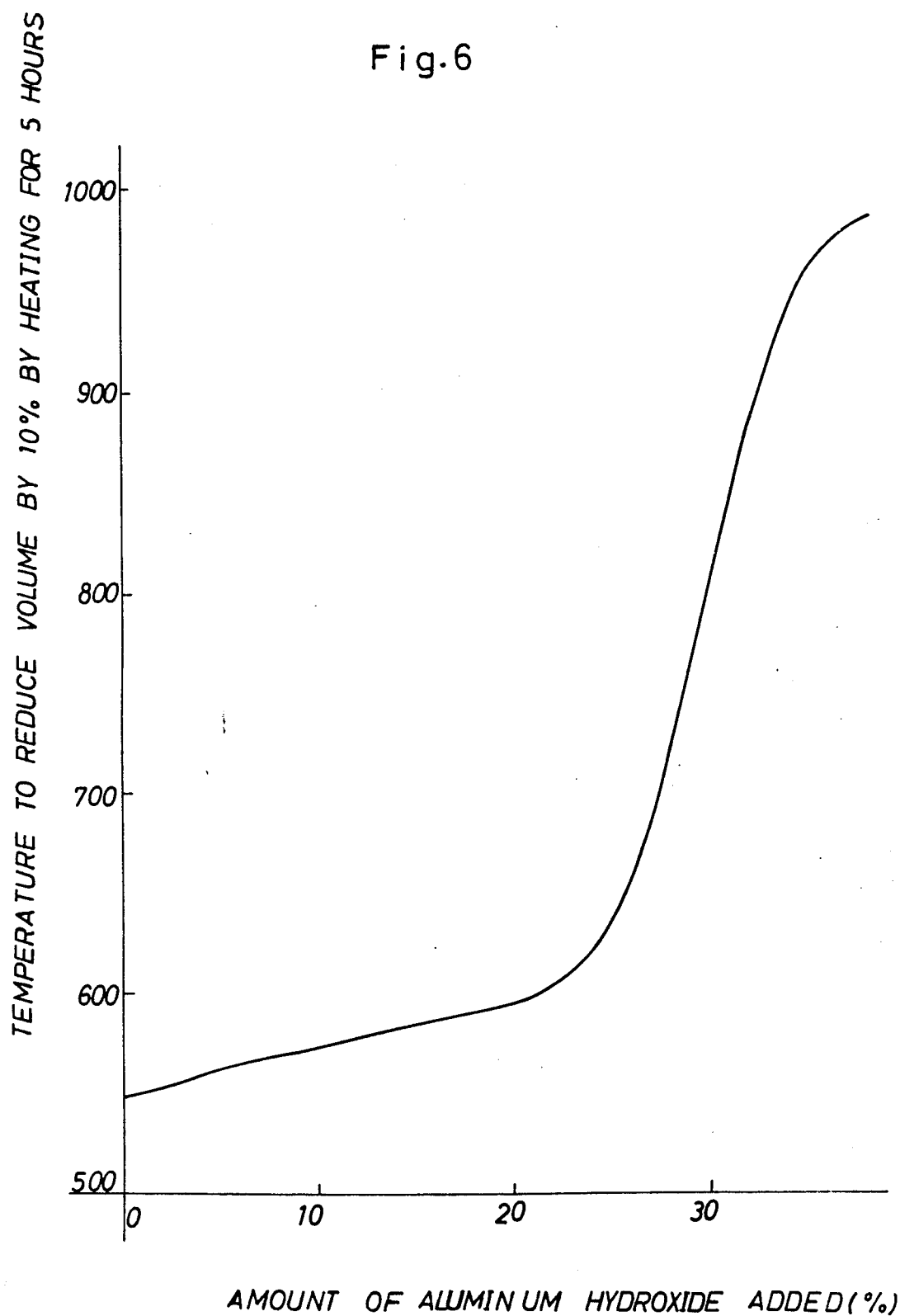
FIG. 6 is a graph showing the relation between the amount of aluminum hydroxide added and the heating temperature at which the reduction in volume reaches 10%, as derived from the results of FIG. 5.

Also from the results shown in FIG. 5, the relationship between the aluminum hydroxide content and the heating temperature required to produce a 10% reduction in volume has been derived and plotted in FIG. 6, which shows that an aluminum hydroxide in excess of 30% brings about a great improvement in heat resistance.

TEST EXAMPLE 3

Powder No. 6 was blended with 5–35% by weight of granular ceramic fibers less than 1mm in particle size (composition: $SiO_2$—48.2%, $Al_2O_3$—49.1%, $Fe_2O_3$—0.15%, $TiO_2$—0.1%, $CaO$—0.1%, $R_2O$—0.3% balance trace MgO) average fiber diameter 2.8μ, fiber length less than 1mm, fill density 0.2 g/cm³; sold as "Kaowool milled fiber", a tradename of Isolite Industry K.K.). The mixture was charged into a mold; heated for 30 minutes each at 600° C, 700° C, 800° C and 900° C for foaming; and the rate of increase in volume was measured, the results being summarized in Table 2.

TABLE 2

| No. | % of ceramic fibers | Rate of increase in volume at foaming temperature (%) (Heating time 30 min.) | | | | |
|---|---|---|---|---|---|---|
| | | 600° C | 700° C | 800° C | 900° C | 1000° C |
| 10 | 5 | 13.4 | 15.2 | 12.3 | 2.3 | −6.3 |
| 11 | 10 | 1.2 | 15.7 | 6.3 | 4.4 | −9.1 |
| 12 | 15 | 0 | 3.1 | 5.1 | 2.1 | −15.3 |
| 13 | 20 | 0 | 1.3 | 4.5 | 0 | −11.0 |
| 14 | 25 | 0 | 0 | 0 | 0 | −6.0 |
| 15 | 30 | 0 | 0 | 0 | 0 | −2.1 |
| 16 | 35 | 0 | 0 | 0 | 0 | −0.5 |

In Table 2, all of the foamed products ranged in density from 0.6 to 0.7 g/cm³ and the double cylinder of iron in FIG. 1 was used for foaming. Powders with a high content of granular ceramic fibers over 1mm in particle size which were found liable to disturb the homogeneity of structure in the heat-insulating material were removed.

Meanwhile, the foamed products produced at a foaming temperature of 700° C showed 10% volume reduction after 10 hours of heating at 900°–1000° C.

TEST EXAMPLE 4

Powders No. 1 and No. 6 foamed at 600° C and Nos. 10–15 foamed at 700° C were subjected to cold-hot cycles. The foamed products were cut into specimens 5 × 10 × 10mm, which were heated for 3 minutes in a furnace at the temperatures specified in Table 3 and then taken out of the furnace for 3 minutes of forced air cooling, these cold-hot cycles being repeated up to failure of the specimens being tested. The results are summarized in Table 3.

TABLE 3

| No. | Density (g/cm³) | No. of cold-hot cycles to failure | | | |
|---|---|---|---|---|---|
| | | 600° C | 700° C | 800° C | 900° C |
| 1 | 0.26 | over 500 | 431 | 203 | 4 |
| 6 | 0.62 | over 500 | 162 | 29 | 9 |
| 10 | 0.65 | over 500 | over 500 | 477 | 403 |
| 11 | 0.68 | over 500 | over 500 | over 500 | over 500 |
| 12 | 0.71 | over 500 | over 500 | over 500 | over 500 |
| 13 | 0.69 | over 500 | 422 | 94 | 33 |
| 14 | 0.73 | 34 | 22 | 26 | 25 |
| 15 | 0.70 | — | — | — | — |

Failures in the case of Nos. 13, 14 and 15 invariably occurred when they became pulverized under air velocity in quenching. Table 3 shows that an increase in the resistance of foamed ceramic to heat shock results from additions of granular ceramic fibers.

Next, specific examples are given to illustrate the resistances to heat and heat shock of foamed sodium silicate ceramic according to the present invention.

EXAMPLE 1

The heat-insulating space between the heat-insulating inner cylinder 14 and outer cylinder 14' in the manifold reactor 12 of FIGS. 7a and b was 100% filled with foamed ceramic No. 12; and heated for 30 minutes at 800° C to form a heat-insulating layer 15. A vehicle equipped with this manifold reactor was subjected to an endurance test of 2000km run over bad roads. After the test, the heat-insulating layer was cut open for inspection, but no shrinkage was observed except for several cracks. The maximum gas temperature attained in the combustion cylinder was 1000° C and thereby the maximum temperature of the heat-insulating layer turned out to be 930° C.

EXAMPLE 2

The heat-insulating layer of the exhaust pipe illustrated in FIG. 1 was 80% filled with foamed ceramic No. 6 and heated for 30 minutes at 600° C. After a 30,000km run of a vehicle equipped with the resulting heat-insulating layer, the exhaust pipe was cut open for inspection, but no defects were found in the heat-insulating layer. The maximum temperature of the exhaust gas was 850° C and its minimum temperature was 420° C.

What is claimed is:

1. Foamed sodium silicate ceramic having an improved resistance to thermal shock at temperatures over 800° C comprising a first component consisting essentially of 30–36% by weight of aluminum hydroxide plus 5–20% by weight of powdered ceramic fibers, and a second component constituting the balance of the foamed ceramic and consisting essentially of sodium silicate.

2. A process for manufacturing a foamed sodium silicate ceramic having an improved resistance to thermal shock at temperatures over 800° C which comprises the step of mixing a first component consisting essentially of 30–36% by weight of aluminum hydroxide plus 5–20% by weight of powdered ceramic fibers, and a second component constituting the balance of the foamed ceramic and consisting essentially of sodium silicate, charging the mixture into a mold, and foaming said mixture by heating it to a temperature between 600° C and 900° C.

* * * * *